US012698125B2

(12) United States Patent
Hutterer et al.

(10) Patent No.: US 12,698,125 B2
(45) Date of Patent: Aug. 4, 2026

(54) TRANSPORT TRAY FOR PACKAGING UNITS

(71) Applicants: Gerresheimer Glas GmbH, Düsseldorf (DE); Stevanato Group S.p.A., Piombino Dese (IT)

(72) Inventors: Nicole Hutterer, Wackersdorf (DE); Andreas Fraas, Amberg (DE); Ricardo Colchado, Corregidora (MX); Stephen Flynn, Peachtree City, GA (US); Braden Miller, Havertown, PA (US); Scott Rosenman, Mount Laurel, NJ (US); Alessio Bonati, Cadoneghe (IT); Michele Guasti, Treviso (IT); Marco Canestraro, Carmignano di Brenta (IT); Riccardo Prete, Ponte San Nicolo (IT); Gianpaolo Bertolin, Noale (IT)

(73) Assignees: Gerresheimer Glas GmbH, Düsseldorf (DE); Stevanato Group S.p.A., Piombino Dese (IT)

( * ) Notice: Subject to any disclaimer, the term of this patent is extended or adjusted under 35 U.S.C. 154(b) by 0 days.

(21) Appl. No.: 17/746,588

(22) Filed: May 17, 2022

(65) Prior Publication Data
US 2022/0371765 A1 Nov. 24, 2022

Related U.S. Application Data

(60) Provisional application No. 63/190,086, filed on May 18, 2021.

(51) Int. Cl.
*B65D 1/36* (2006.01)
*B29C 45/00* (2006.01)
(Continued)

(52) U.S. Cl.
CPC ............ *B65D 1/36* (2013.01); *B29C 45/0001* (2013.01); *B29K 2505/02* (2013.01); *B29K 2995/0013* (2013.01); *B29L 2031/712* (2013.01)

(58) Field of Classification Search
CPC .... B65D 71/70; B65D 25/108; B65D 5/5033; B65D 21/0215; B65D 81/053
(Continued)

(56) References Cited

U.S. PATENT DOCUMENTS

| | | | |
|---|---|---|---|
| 2,702,647 A | * | 2/1955 | Wesling ................. B65D 25/06 217/18 |
| 4,105,407 A | | 8/1978 | Sanderson |

(Continued)

FOREIGN PATENT DOCUMENTS

| | | |
|---|---|---|
| CN | 1726148 | 1/2006 |
| CN | 101237896 | 8/2008 |

(Continued)

OTHER PUBLICATIONS

Atkins, Nick, "Sterile Ready-to-Fill Components | Adelphi Healthcare Packaging", Nov. 28, 2012, pp. 1-1, Retrieved from the Internet: URL: https://adelphi-hp.com/news-events/sterile-ready-to-fill%C2%AE-components [retrieved on Sep. 23, 2022].
(Continued)

*Primary Examiner* — Robert Poon
(74) *Attorney, Agent, or Firm* — Fish & Richardson P.C.

(57) ABSTRACT
A transport tray with a plurality of sleeves each configured to receive a substantially cylindrical container having a cylindrical container wall and a container bottom surface arranged orthogonally to the container wall. Each sleeve includes a top opening, a bottom opening, a sleeve wall that extends along a sleeve axis between the top opening and the bottom opening and is configured to abut at least a portion
(Continued)

of the container wall of a respective container, and one or more support feet adjacent to the bottom opening and extending from the sleeve wall towards the sleeve axis, wherein each support foot has a bottom surface and a top surface configured to abut the container bottom surface of a respective container forming a gap between the support foot bottom surface and the container bottom surface along the sleeve axis. The one or more support feet comprise a thermally conductive polymer.

18 Claims, 8 Drawing Sheets

(51) Int. Cl.
　　*B29K 505/02*　　　(2006.01)
　　*B29L 31/00*　　　(2006.01)

(58) Field of Classification Search
　　USPC ........ 206/564, 562, 443, 586, 563, 557, 453
　　See application file for complete search history.

(56) References Cited

U.S. PATENT DOCUMENTS

| | | | |
|---|---|---|---|
| 4,126,224 A | 11/1978 | Laauwe et al. | |
| 4,174,034 A | 11/1979 | Hoo | |
| 4,457,432 A | 7/1984 | Solheim | |
| 4,561,544 A | 12/1985 | Reeve | |
| 4,722,440 A * | 2/1988 | Johnston | B65D 71/70 |
| | | | 206/319 |
| 5,080,222 A | 1/1992 | McNary | |
| 5,246,134 A | 9/1993 | Roth et al. | |
| 5,275,291 A | 1/1994 | Sledge | |
| 5,372,787 A | 12/1994 | Ritter | |
| 5,697,514 A | 12/1997 | Hekal | |
| 6,048,503 A | 4/2000 | Riley et al. | |
| 7,021,485 B1 | 4/2006 | Baker et al. | |
| 7,300,637 B2 | 11/2007 | Lin et al. | |
| 7,608,218 B2 | 10/2009 | Fryer et al. | |
| 7,708,142 B2 | 5/2010 | Ehrlund | |
| 7,823,725 B1 | 11/2010 | Shupe | |
| 8,679,404 B2 | 3/2014 | Liburd et al. | |
| 9,918,898 B2 | 3/2018 | Fadeev et al. | |
| 9,938,042 B1 | 4/2018 | Aryanpanah et al. | |
| 10,017,294 B2 | 7/2018 | Deutschle et al. | |
| 10,244,973 B2 | 4/2019 | Holmes et al. | |
| 10,703,539 B2 | 7/2020 | Deutschle et al. | |
| 10,918,754 B2 | 2/2021 | Shodder | |
| 12,006,125 B2 | 6/2024 | Hutterer et al. | |
| 2002/0022246 A1 | 2/2002 | Lin et al. | |
| 2003/0091471 A1 | 5/2003 | Lacabanne | |
| 2003/0183547 A1 | 10/2003 | Heyman | |
| 2003/0199082 A1 | 10/2003 | Miller et al. | |
| 2004/0062692 A1 | 4/2004 | Lin et al. | |
| 2006/0086638 A1 | 4/2006 | Priebe et al. | |
| 2007/0181458 A1 | 8/2007 | Ehlund | |
| 2007/0196632 A1 | 8/2007 | Meyer et al. | |
| 2008/0236631 A1 | 10/2008 | Lin et al. | |
| 2008/0317912 A1 | 12/2008 | Keller et al. | |
| 2009/0158912 A1 | 6/2009 | Nesbitt | |
| 2011/0086141 A1 * | 4/2011 | Strilich | B65D 75/5855 |
| | | | 426/106 |
| 2011/0094901 A1 * | 4/2011 | Ingvardsen | B25H 3/06 |
| | | | 206/503 |
| 2011/0296800 A1 | 12/2011 | Clark et al. | |
| 2012/0211492 A1 | 8/2012 | Kelly | |
| 2013/0169132 A1 | 7/2013 | Johnson et al. | |
| 2013/0280134 A1 | 10/2013 | Hoffman et al. | |
| 2014/0027326 A1 | 1/2014 | Peruzzo | |
| 2014/0216059 A1 | 8/2014 | Moore et al. | |
| 2015/0108034 A1 | 4/2015 | Deutschle et al. | |
| 2015/0166217 A1 | 6/2015 | Deutschle et al. | |
| 2015/0175304 A1 | 6/2015 | Ficker | |
| 2016/0288126 A1 * | 10/2016 | Motadel | B65D 25/108 |
| 2017/0073091 A1 | 3/2017 | Deutschle et al. | |
| 2017/0225162 A1 | 8/2017 | Liu et al. | |
| 2017/0247132 A1 | 8/2017 | Deutschle et al. | |
| 2017/0333938 A1 | 11/2017 | Brennan et al. | |
| 2018/0057249 A1 * | 3/2018 | Bertolin | B65D 85/42 |
| 2018/0116907 A1 | 5/2018 | Fadeev et al. | |
| 2018/0208377 A1 | 7/2018 | Kloke et al. | |
| 2018/0265263 A1 | 9/2018 | Li | |
| 2019/0083697 A1 | 3/2019 | Evans et al. | |
| 2019/0299217 A1 * | 10/2019 | Motadel | B01L 9/543 |
| 2019/0343721 A1 * | 11/2019 | Komann | B65B 43/54 |
| 2020/0147253 A1 | 5/2020 | Spencer et al. | |
| 2020/0246223 A1 | 8/2020 | Nicolas et al. | |
| 2022/0371760 A1 | 11/2022 | Redeker et al. | |
| 2022/0371762 A1 | 11/2022 | Rosenman et al. | |
| 2022/0371773 A1 | 11/2022 | Hutterer et al. | |
| 2022/0371781 A1 | 11/2022 | Hutterer et al. | |
| 2022/0371807 A1 | 11/2022 | Hutterer et al. | |
| 2024/0286816 A1 | 8/2024 | Hutterer et al. | |

FOREIGN PATENT DOCUMENTS

| | | |
|---|---|---|
| CN | 101272811 | 9/2008 |
| CN | 101336194 | 12/2008 |
| CN | 104271346 | 1/2015 |
| CN | 104755604 | 7/2015 |
| CN | 106347771 | 1/2017 |
| CN | 106458416 | 2/2017 |
| CN | 106998715 | 8/2017 |
| CN | 207045959 U | 2/2018 |
| CN | 108473247 | 8/2018 |
| CN | 208761268 U | 4/2019 |
| CN | 110481984 A | 11/2019 |
| CN | 210285018 U | 4/2020 |
| CN | 111655590 A | 9/2020 |
| CN | 212654814 U | 3/2021 |
| DE | 2952733 | 7/1981 |
| DE | 9112325 | 11/1991 |
| DE | 202012010704 | 12/2012 |
| DE | 102013114404 A1 | 6/2015 |
| DE | 102020206748 | 12/2020 |
| EP | 0780315 | 6/1997 |
| EP | 0903176 | 3/1999 |
| EP | 1780143 | 5/2007 |
| EP | 2408483 | 1/2012 |
| EP | 2543391 | 3/2016 |
| EP | 3345587 | 7/2018 |
| FR | 1277678 | 12/1961 |
| FR | 1439210 | 5/1966 |
| FR | 3020801 A1 | 11/2015 |
| GB | 2056262 A | 3/1981 |
| JP | H07-61445 A | 3/1995 |
| JP | 2001-502280 A | 2/2001 |
| JP | 2001112857 | 4/2001 |
| JP | 2016196306 A | 11/2016 |
| KR | 20000020817 U | 12/2000 |
| KR | 20120006140 | 9/2012 |
| WO | WO 2010/106168 | 9/2010 |
| WO | WO 2011/135085 | 11/2011 |
| WO | WO 2014/130349 | 8/2014 |
| WO | WO 2015/076780 | 5/2015 |
| WO | WO 2017/044906 | 3/2017 |
| WO | WO 2018/175985 | 9/2018 |
| WO | WO 2020/262760 A1 | 12/2020 |
| WO | WO 2021050450 | 3/2021 |

OTHER PUBLICATIONS

Extended European Search Report in European Appln No. 22174019.4, dated Oct. 20, 2022, 8 pages.

Lavajo Nathalie et al: "Specifications—Vials and bottles for parenteral application Code: PC-00132 Revision : 08 Specifications Vials and bottles for parenteral application: Injectables Infusions Approval cycle", Oct. 16, 2019, pp. 1-25, Retrieved from the Internet: URL:https://www.sgd-pharma.com/sites/default/files/mediacenter/pc-00132_08_-_specifications_-_parenteral_application_vials_and_bottles_0.pdf [retrieved on Mar. 24, 2023].

(56) References Cited

OTHER PUBLICATIONS

Le Printing Machine Factory Limited: "How to Manufacture Glass Bottles", Sep. 10, 2016, Retrieved from the Internet: URL:https://www.youtube.com/watch?v=hGjYRaYjryI [retrieved on Mar. 24, 2023].

Manufacturing Chemist Redactor: "Pure, smooth and strong", Apr. 16, 2021, pp. 1-10, Retrieved from the Internet: URL:https://www.manufacturingchemist.com/news/article_page/Pure_smooth_and_strong/175981 [retrieved on Mar. 24, 2023].

Schott: "EVERIC smooth", Jan. 17, 2020, Retrieved from the Internet: URL:https://www.youtube.com/watch?v=niHtVIYbQaM [retrieved on Jun. 30, 2023].

Wang, "Science of Packaging Materials," China Light Industry Press, Feb. 28, 2017, pp. 188-189.

Xiao et al., "Roll-forming process and CAE analysis of drawer idler slide rail," Forging & Stamping Technology, 2010, 35(2):31-34 (Abstract only).

Office Action in Chinese Appln. No. 202210538010.5, mailed on Feb. 18, 2025, 8 pages (with English Translation).

Kegao et al., "Craftsman design of shipping packaging size (I)," Shanghai Packaging, Jun. 28, 2016, 6:13-15 (Abstract Only).

Office Action in Chinese Appln. No. 202210538010.5, mailed Oct. 23, 2024, 14 pages (with English Translation).

Office Action in Indian Appln. No. 202214028344, mailed on Apr. 6, 2026, 10 pages.

* cited by examiner

TRANSPORT TRAY FOR PACKAGING UNITS

CROSS-REFERENCE TO RELATED APPLICATION

This application claims the benefit of priority to U.S. Provisional Patent Application No. 63/190,086, filed on May 18, 2021, the entire contents of which are incorporated by reference herein.

BACKGROUND

This disclosure relates to a tray for transporting packaging units.

In industrial contexts, products are generally transported and sold in packaging units. Packaging units can include vials, cartridges, ampoules, bottles, or pre-fillable syringes. In many industries, these different types of packaging units are collectively known as "primary packaging," i.e., the packaging that comes into direct contact with an end product. The end product may be a food product, a cosmetic product, or a pharmaceutical product. Primary packaging can undergo numerous manufacturing processes before being filled with the end product. During these processes, primary packaging is often transported and processed in batches.

U.S. Pat. No. 10,703,539 B2 describes a carrier in which retaining protrusions provided at lower ends of apertures or receptacles of a supporting structure protrude inward in a radial direction into the apertures or receptacles for supporting vials in cooperation with transition regions or edge portions of the vials in such a manner that bottoms of the vials, or more generally the lower ends of the vials, jut out of the apertures or receptacles and are thus are freely accessible from the lower side of the carrier.

US 2018/0208377 A1 describes a supporting structure that has an upper side or base plane, which generally is formed as a plate and whose circumferential edge is formed flat. In the upper side, a plurality of openings is formed, which are arranged in rows and columns extending perpendicular to each other. The openings of adjacent rows or columns are arranged staggered relative to each other, which enables a higher packing density with the hexagonal arrangement of the peripheral webs. A plurality of axial connecting webs protrude perpendicularly from the underside of the supporting structure, which are connected to each other at their lower ends via circumferential bottom webs.

WO 2014/130349 A1 describes a tray with receptacles that are configured to support vials in different manners during different stages of processing. Each receptacle has a bottom opening defined at a bottom edge of lower portion of a cylindrical wall, and an inwardly extending lip surrounding each opening. The opening has an inner diameter slightly smaller than the outer diameter of the vial side wall, but slightly larger than the bottom wall, such that the inner edges of lip contact a portion of curved lower edge joining side wall and bottom wall. This configuration permits the vial to be supported by the tray while suspended, with a lower portion of the vial protruding downward from the bottom edge of the tray.

SUMMARY

Aspects of the present disclosure aim to alleviate problems associated with known transport trays.

According to a general aspect of the present disclosure, a transport tray includes a plurality of sleeves that are each configured to receive a substantially cylindrical container having a cylindrical container wall and a container bottom surface arranged orthogonally to the container wall. Each sleeve includes a top opening, a bottom opening, a sleeve wall that extends along a sleeve axis between the top opening and the bottom opening and is configured to abut at least a portion of the container wall of a respective container, and one or more support feet that are adjacent to the bottom opening and extend from the sleeve wall towards the sleeve axis, wherein each support foot comprises a bottom surface and a top surface configured to abut the container bottom surface of a respective container, such that a gap is formed between the support foot bottom surface and the container bottom surface along the sleeve axis. The one or more support feet comprise a thermally conductive polymer.

In some instances, each sleeve can include a ring that connects the one or more support feet to the bottom opening and that comprises a thermally conductive polymer. Further, each sleeve can be a monolithic structure that comprises a thermally conductive polymer.

In addition to the respective sleeves, the entire transport tray may be a monolithic structure that comprises a thermally conductive polymer. For example, the transport tray may be manufactured by injection molding a thermally conductive polymer.

The thermally conductive polymer may comprise an aluminum filler, a zinc filler, or a combination thereof.

Each sleeve wall may include a closed cylinder that encircles the sleeve axis.

The top opening of each sleeve may be larger than the bottom opening, such that the sleeve wall forms an angle greater than 0° relative to the sleeve axis.

The transport tray may include a plate portion connected to the top opening of each sleeve. A connecting portion may connect the sleeve walls of at least two adjacent sleeves to the plate portion. The plate portion may comprise a plurality of corner regions and a raised bumper arranged at each corner region. Such a raised bumper has a height that is greater than a thickness of the plate portion. Each raised bumper may include at least one projection that extends outward from a perimeter of the plate portion. The perimeter of the plate portion may include the raised bumpers and an edge portion having the same thickness as the plate portion arranged between each pair of adjacent raised bumpers.

These and other embodiments described herein may provide one or more of the following benefits. The transport tray may be suitable for transferring heat to and from the packaging units. For example, the transport tray may be used in a lyophilization process. At the same time, the transport tray may securely support the packaging units in other processes, such as direct filling processes. Overall, the transport tray may reduce the need to handle individual packaging units during the manufacturing process. Further, the design of the transport tray may be compatible with existing equipment. The transport tray may also prove to be robust.

DESCRIPTION OF THE DRAWINGS

Certain embodiments will now be described, by way of example only, with reference to the accompanying drawings, in which.

Like reference numbers and designations in the various drawings indicate like elements.

DETAILED DESCRIPTION

Figure 1:
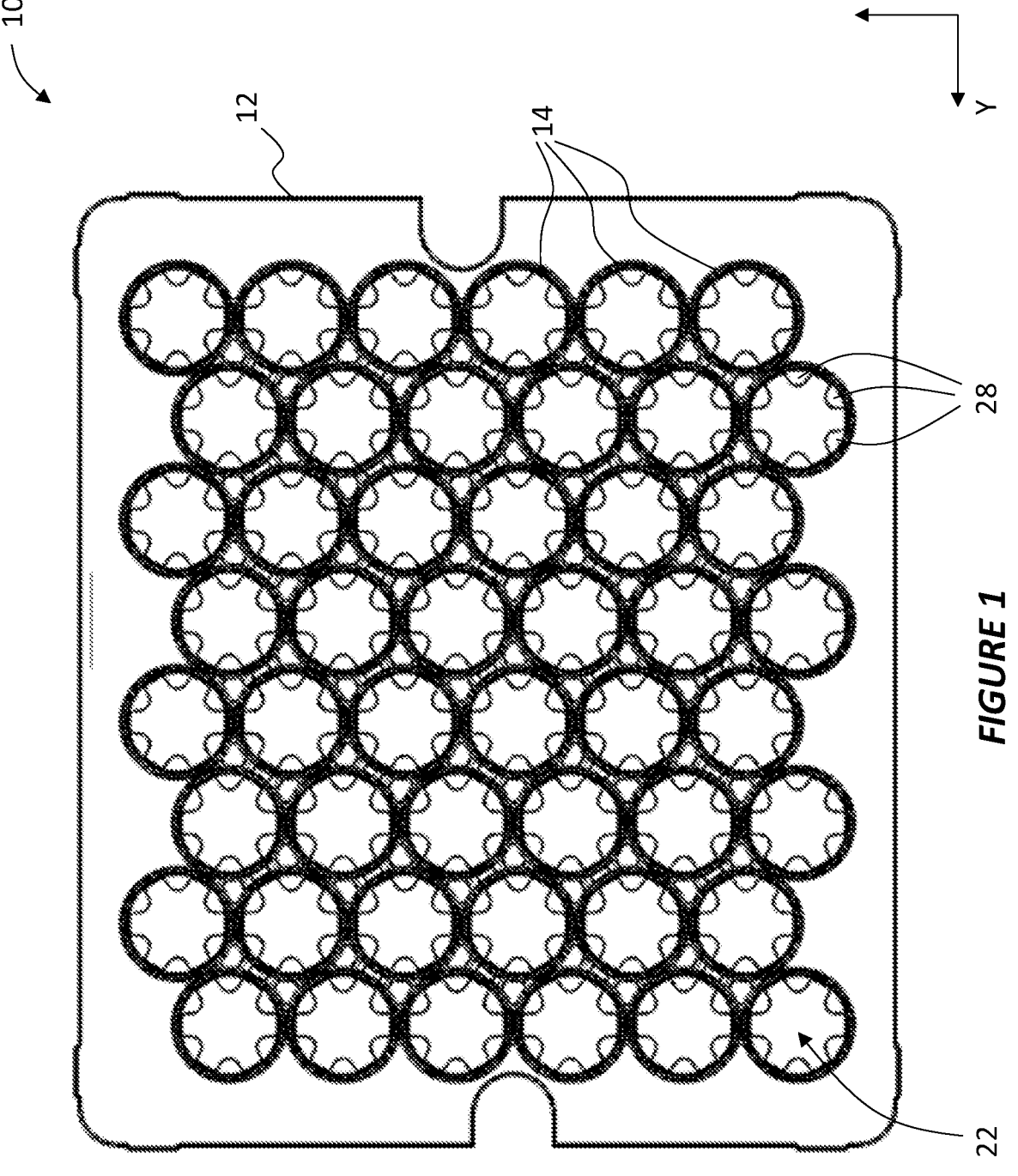
FIG. 1 shows a transport tray according to the present disclosure from above.
Figure 4A:
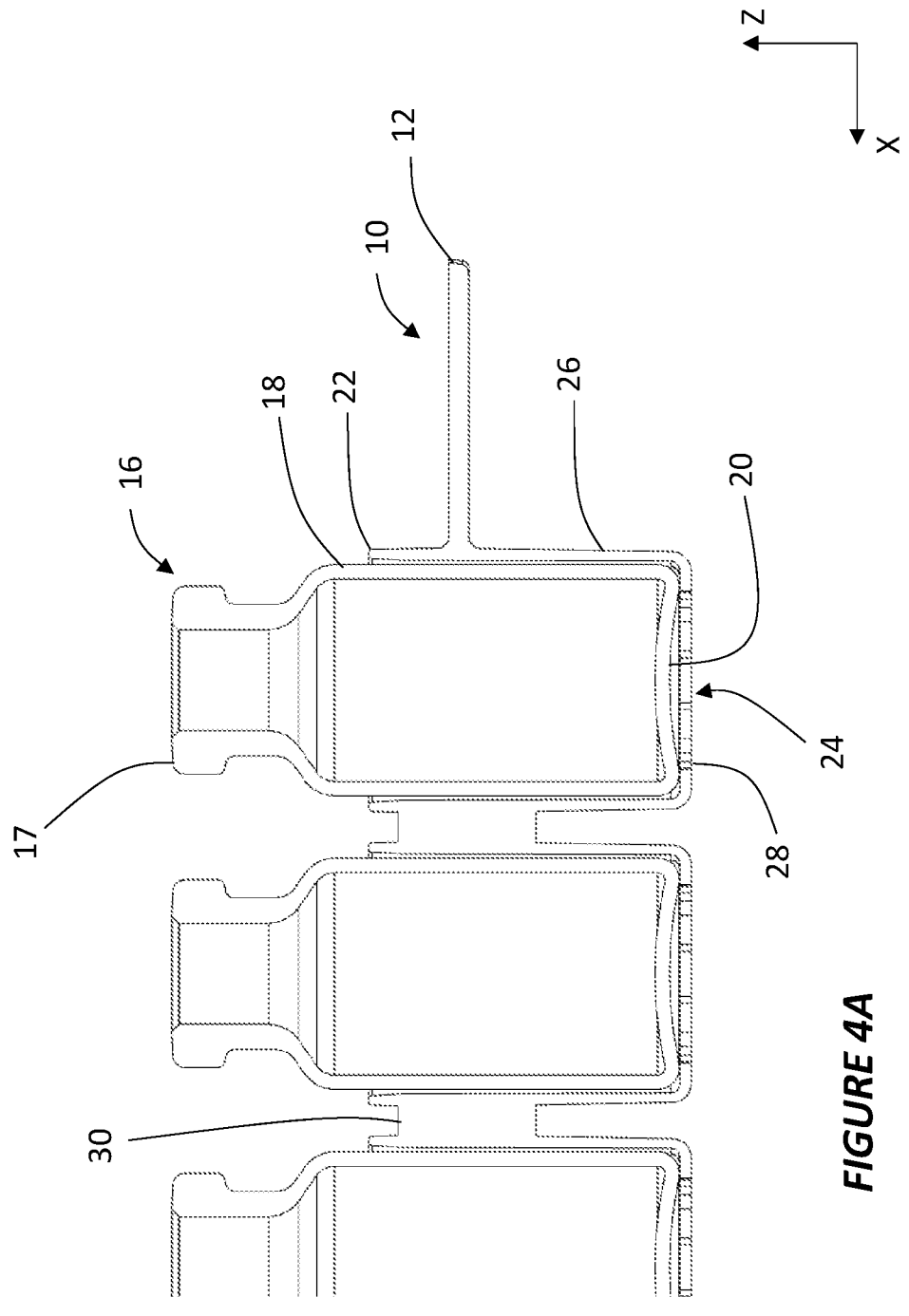
FIGS. 4A and 4B show cross-sectional views through the transport tray of FIGS. 1 to 3.

FIG. 1 shows a transport tray 10 according to the present disclosure from above. The transport tray 10 includes a plate portion 12 and a plurality of sleeves 14. The sleeves 14 are each configured to receive a substantially cylindrical container 16 having a cylindrical container wall 18 and a container bottom surface 20 arranged orthogonally to the container wall 18 (FIG. 4A). The containers 16 can serve as primary packaging for various types of end products. Although the expression "primary packaging" can encompass vials, cartridges, ampoules, bottles, and syringes to name a few examples, the figures of the present disclosure illustrate vials. The transport tray 10 can be used to group and transport the vials 16 throughout different manufacturing processes, for example.

Figure 2:
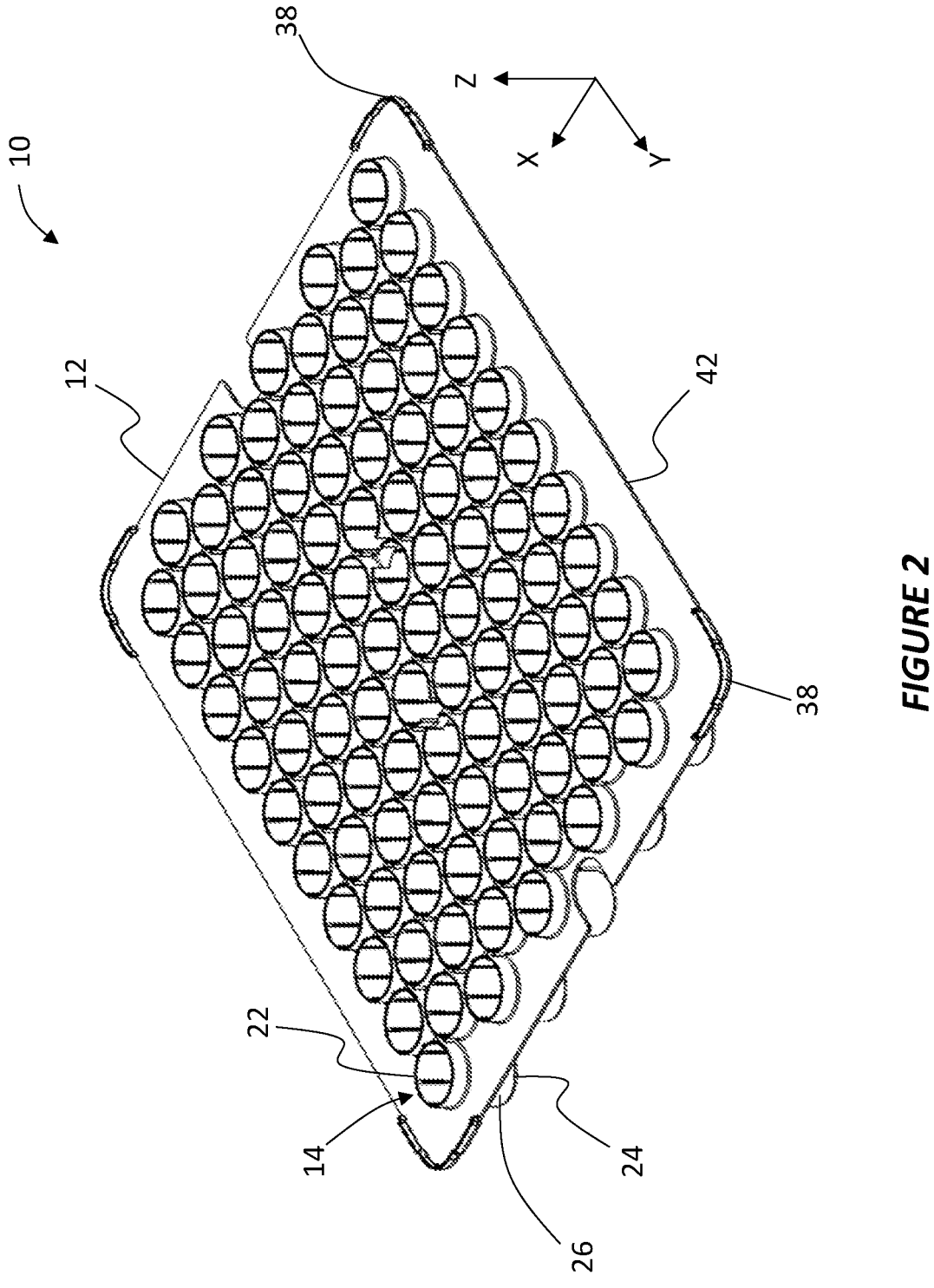
FIG. 2 shows a perspective view of the transport tray of FIG. 1.

As shown in FIG. 2, each sleeve 14 includes a top opening 22, a bottom opening 24, a sleeve wall 26 that extends along a sleeve axis between the top opening 22 and the bottom opening 24. Referring to the coordinate axes shown in FIG. 2, the sleeve axis of each sleeve 14 extends along the Z-axis.

Figure 3:
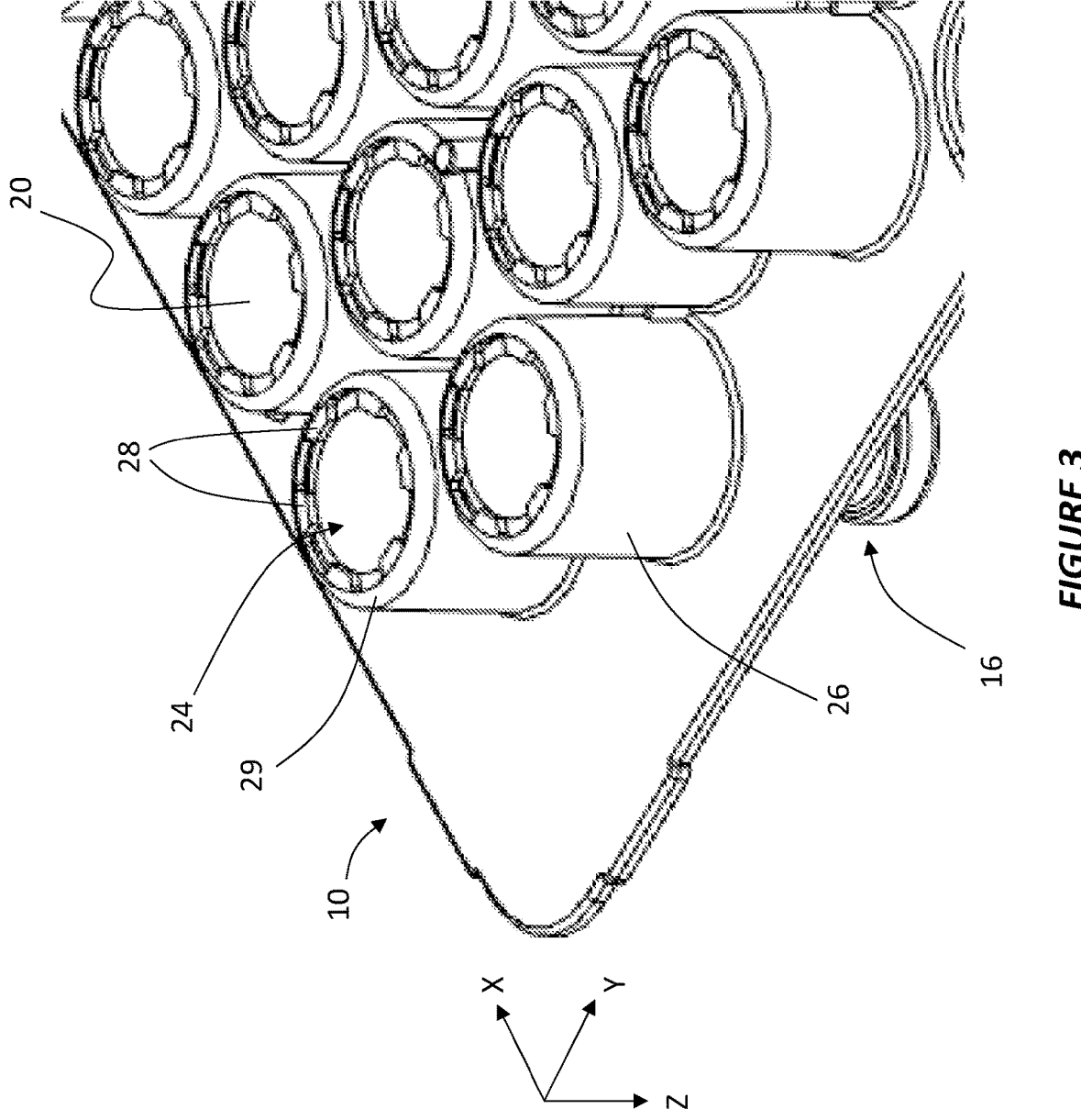
FIG. 3 shows a partial perspective view of a bottom of the transport tray of FIG. 1.
Figure 4B:
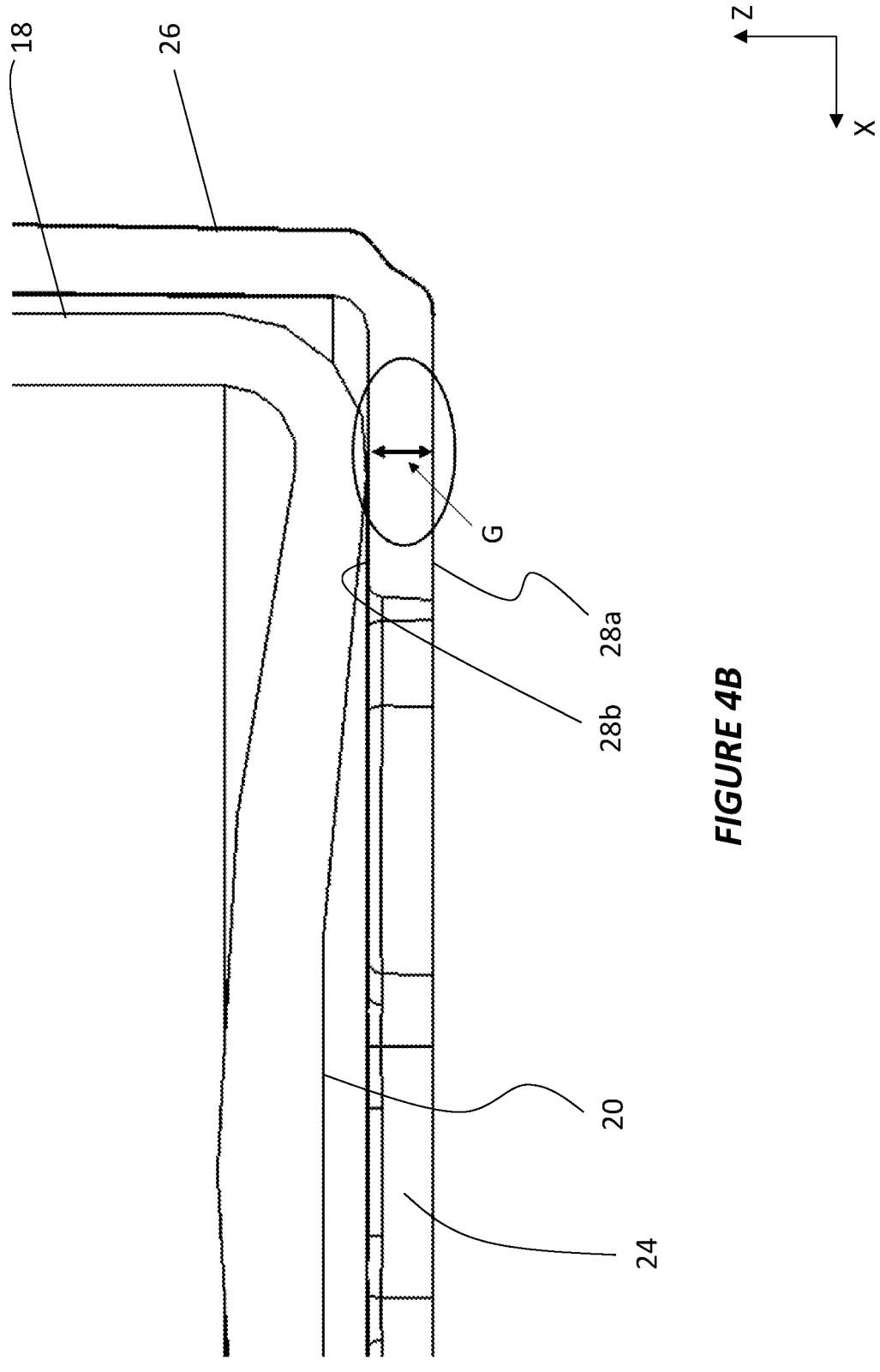

FIGS. 3, 4A and 4B show the transport tray 10 of FIGS. 1 and 2 with a plurality of containers 16 arranged in the sleeves 14. The containers 16 are arranged in the sleeves 14 such that the sleeve wall 26 faces the container wall 18 (FIG. 4A). The container 16 includes an opening 17 that is arranged facing the top opening 22 of the sleeve 14, while the bottom surface 20 of the container is adjacent to the bottom opening 24 of the sleeve 14. Each sleeve 14 includes one or more support feet 28 that are adjacent to the bottom opening 24 and extend from the sleeve wall 26 towards the sleeve axis. Each support foot 28 comprises a bottom surface 28a and a top surface 28b configured to abut the container bottom surface 20 of the container 16 received in the sleeve. The support foot 28 is designed so that a gap G is formed between the support foot bottom surface 28a and the container bottom surface 20 along the sleeve axis (FIG. 4B).

Accordingly, the transport tray 10 rests on the collective support foot bottom surfaces 28a of each of the support feet 28, while each container bottom surface 20 rests entirely on the support foot top surfaces 28b of the support feet 28 in a respective sleeve 14. As shown in FIGS. 4A and 4B, the container bottom surface 20 does not extend past the support feet 28. In other words, the container bottom surface 20 is separated from the surface on which the transport tray 10 rests. In practice, this may mean that the support foot top surface 28b makes contact with the lowest point of the container bottom surface 20.

According to the present disclosure, the one or more support feet 28 include a thermally conductive polymer. For example, the one or more support feet 28 are formed as a single part, e.g., of injection molded plastic with thermally conductive fillers. Such support feet 28 may be attached to the sleeves 14 using insert molding techniques. For example, the filler may include an aluminum filler, a zinc filler, or a combination thereof. In some instances, the one or more support feet 28 can be attached to the bottom opening 24 by a ring 29 (FIG. 3). The ring 29 may also include a thermally conductive polymer. The ring 29 and the one or more support feet 28 may be integrally formed, i.e., form a monolithic structure. In some instances, the entire sleeve 14, or even the entire support tray 10, may be a monolithic structure. For example, the transport tray 10 may be manufactured by injection molding a thermally conductive polymer. As described above, the container bottom surface 20 rests on the support foot top surfaces 28b of each sleeve 14.

Since at least the one or more support feet 28 include thermally conductive polymer, the support feet 28 are able to transfer heat to and from the container bottom surface 20. Accordingly, the transport tray 10 may be used during a lyophilization process with the containers 16 remaining in the sleeves 14. Since the container bottom surface 20 does not protrude through the bottom opening 24 of the sleeve 14, the same transport tray 10 can be used for other processes, e.g., a direct fill process. Thus, the transport tray 10 according to the present disclosure may contribute to the efficiency of the manufacturing process for primary packaging.

The transport tray 10 may include any number of the following features that may improve the robustness and heat transfer of the transport tray 10.

As shown in FIG. 3, for example, each sleeve wall 26 may include a closed cylinder that completely encircles the sleeve axis and, thus, a portion of the container wall 18. In cases in which the entire sleeve 14 includes a thermally conductive polymer, this closed cylinder design can increase the amount of thermally conductive polymer that surrounds the container wall 18 and improve heat transfer, e.g., during the lyophilization process. At the same time, the closed cylinder may improve the robustness of the sleeve 14 and transport tray 10, respectively.

The top opening 22 of each sleeve 14 may be larger than the bottom opening 24, such that the sleeve wall forms an angle greater than 0° relative to the sleeve axis. Such a taper may make it easier to retrieve the container 16 from the sleeve 14 despite the closed cylinder design described above.

As shown in FIG. 4A, the transport tray 10 may include a connecting portion 30 that connects the sleeve walls 26 of at least two adjacent sleeves to the plate portion 12. The connecting portion 30 can also increase the volume of thermally conductive polymer and, thus, the heat transfer through the transport tray 10 and its overall robustness.

Figure 5A:
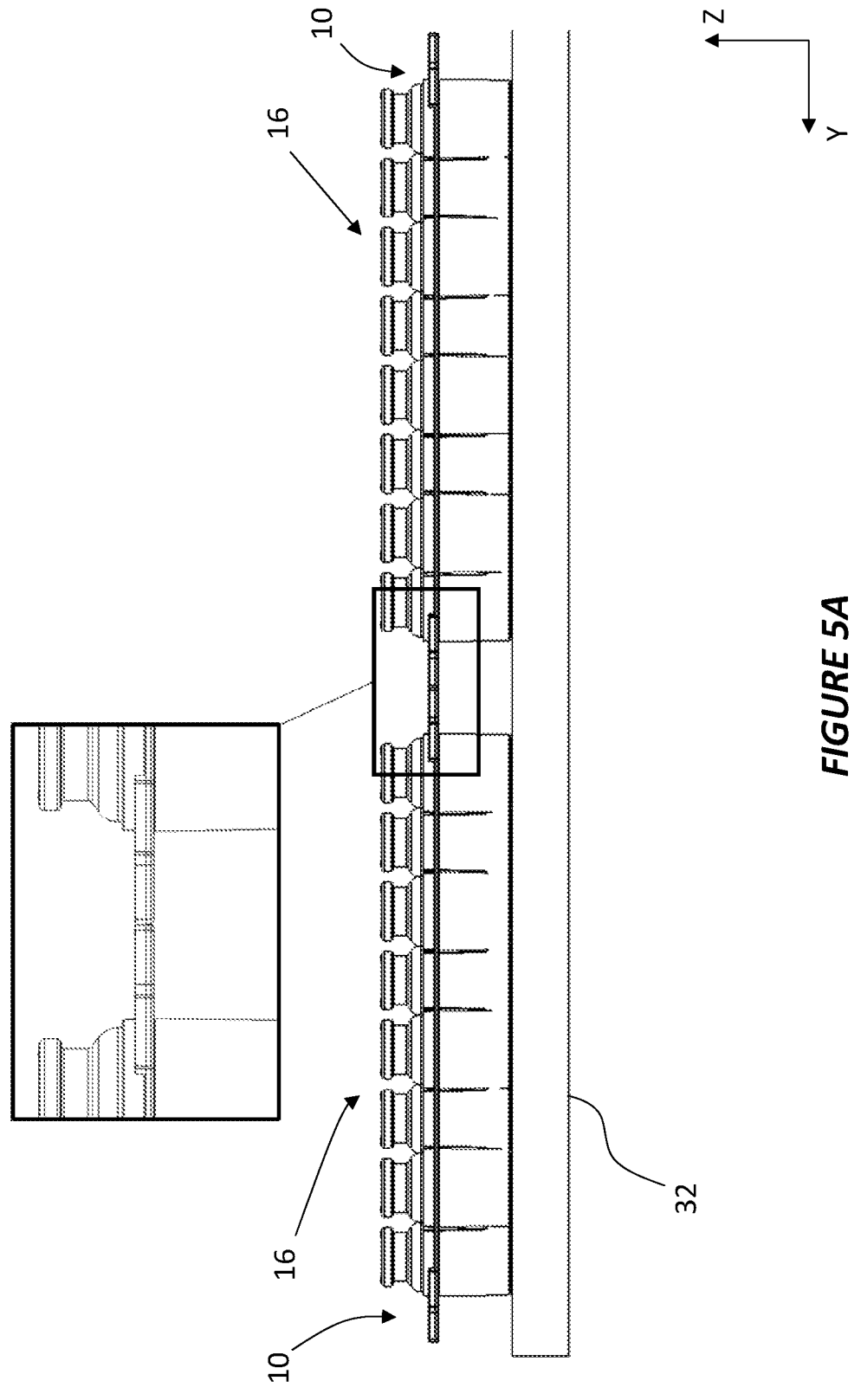
FIGS. 5A and 5B schematically show multiple transport trays placed next to one another on a table.
Figure 5B:
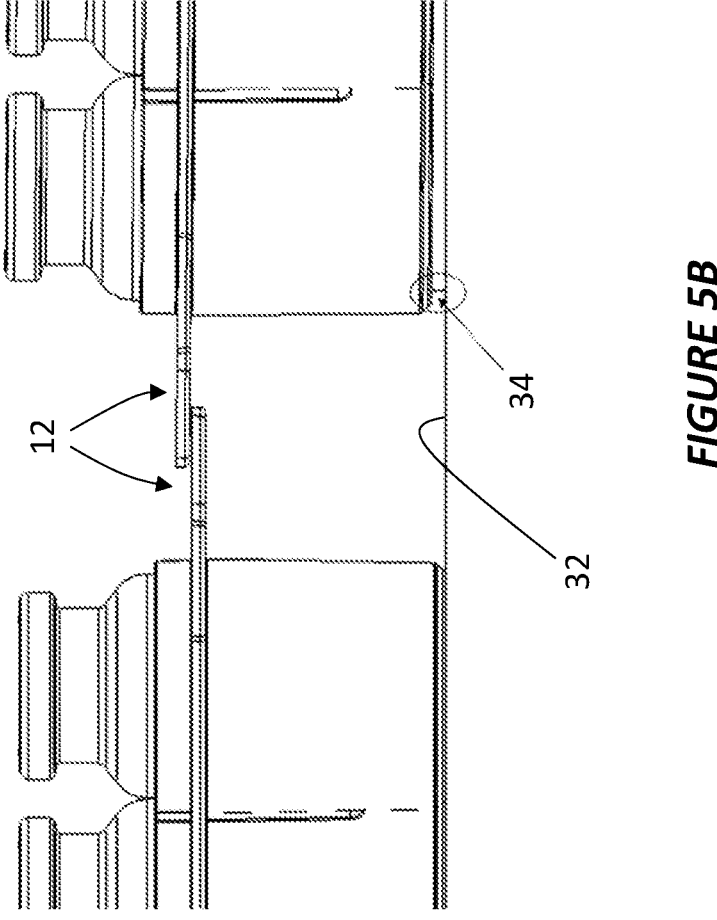
Figure 5C:
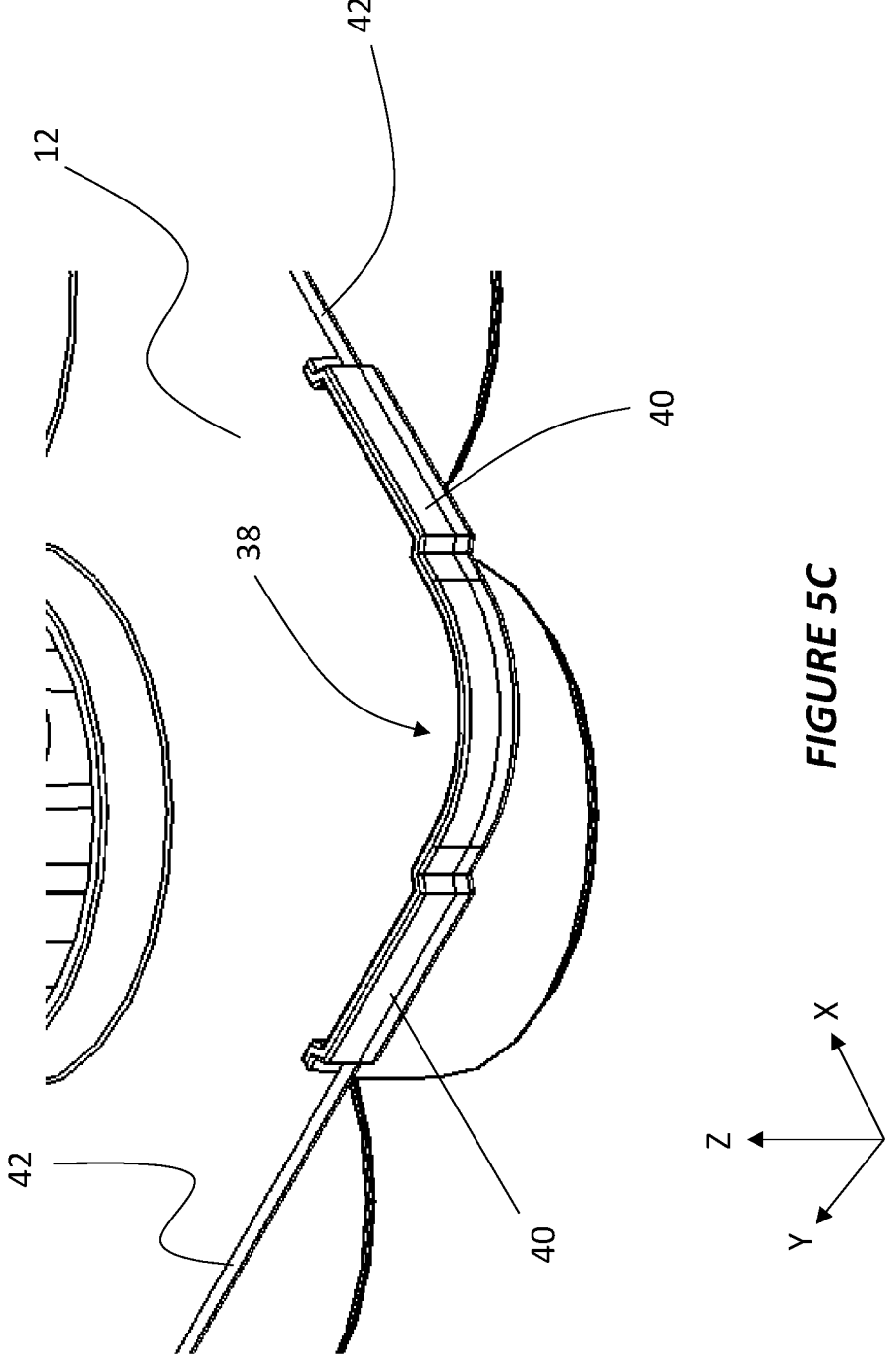
FIG. 5C shows a partial perspective view of the transport tray of FIG. 2.

FIGS. 5A to 5C show optional features of the transport tray 10 that may enable several transport trays 10 to be neatly stacked next to one another. As shown in FIG. 5A, a first and second transport tray 10 are each loaded with a plurality of containers 16 and placed next to one another on a table 32. For example, the table 32 may be used for a lyophilization process to rapidly cool the containers 16 and their contents.

As shown in the enlarged portion of FIG. 5A, the plate portions 12 of each transport tray 10 are arranged closely next to each other without touching. Such an arrangement may allow the greatest possible number of containers 16 to be placed on the table at once. FIG. 5B shows a scenario in which adjacent transport trays 10 have been placed so closely together that the plate portions 12 overlap. This overlap in the plate portions creates a gap 34 between the table 32 and the transport tray 10 on the right. This gap 34 may reduce the efficiency of the heat transfer between the table 32, the transport tray 10, and the containers 16.

In order to prevent the overlap shown in FIG. 5B, each corner region 36 of the plate portion 12 may be provided with one or more features that reduce the likelihood that adjacent transport trays 10 overlap one another. As shown in FIG. 5C, each corner region 36 of the plate portion 12 can include a raised bumper 38. In the context of this disclosure, "raised" can mean that a height of the bumper 38 along the Z-axis is greater than a thickness of the plate portion 12 along the Z-axis. When two transport trays 10 are brought close together, the matching bumpers 38 may come into contact and prevent the plate portions 12 from overlapping.

In some instances, the raised bumper 38 can include a first and a second projection 40 that increase the stability of the raised bumper 38. In FIG. 5C, the first projection 40 extends outward from the plate portion 12 along the X-axis, and the second projection 40 extends outward from the plate portion 12 along the Y-axis.

The raised bumper 38 can include a strip of material that continuously wraps around the corner region 36 of the plate portion. Each end of the raised bumper 38 can abut an edge portion 42 of the plate portion 12 that does not have an increased thickness (see also FIG. 2). In some instances, the combination of alternating raised bumpers 38 and edge portions 42 may improve air flow during injection molding of the transport tray 10. However, it is also possible for the raised bumper 38 to extend around the entire perimeter of the plate portion 12.

A number of embodiments have been described. Nevertheless, numerous alternative embodiments within the scope of the claims will be readily appreciated by those skilled in the art. The presently described embodiments are not to be taken as limiting the scope of the invention.

The invention claimed is:

1. A transport tray comprising:
a plurality of sleeves, wherein each sleeve is configured to receive a substantially cylindrical container having a cylindrical container wall and a container bottom surface arranged orthogonally to the container wall;
wherein each sleeve comprises
a top opening,
a bottom opening,
a sleeve wall that extends along a sleeve axis between the top opening and the bottom opening and is configured to abut at least a portion of the container wall of a respective container, and
one or more support feet that are adjacent to the bottom opening and extend from the sleeve wall towards the sleeve axis, wherein each support foot comprises a bottom surface and a top surface configured to abut the container bottom surface of a respective container, such that a gap is formed between the support foot bottom surface and the container bottom surface along the sleeve axis, and wherein the one or more support feet comprise a thermally conductive polymer;
a plate portion connected to the top opening of each sleeve and comprising a plurality of corner regions; and
a raised bumper arranged at least at each corner region of the plate portion, wherein the raised bumper has a height that is greater than a thickness of the plate portion;
wherein each raised bumper is positioned at a respective corner region of the plate portion and comprises a first projection and a second projection spaced apart from the first projection, where the first projection is positioned on a first side of the respective corner region and the second projection is positioned on a second side of the respective corner region, the first projection and the second projection extend from a perimeter of the plate portion in an outward direction that is in-plane with a top surface of the plate portion.

2. The transport tray according to claim 1, wherein each sleeve further comprises a ring that connects the one or more support feet to the bottom opening, wherein the ring comprises a thermally conductive polymer.

3. The transport tray according to claim 2, wherein each sleeve is a monolithic structure that comprises a thermally conductive polymer.

4. The transport tray according to claim 3, wherein the transport tray is a monolithic structure that comprises a thermally conductive polymer.

5. The transport tray according to claim 4, wherein the transport tray is manufactured by injection molding a thermally conductive polymer.

6. The transport tray according to claim 1, wherein the thermally conductive polymer comprises an aluminum filler.

7. The transport tray according to claim 1, wherein the thermally conductive polymer comprises a zinc filler.

8. The transport tray according to claim 1, wherein each sleeve wall comprises a closed cylinder that encircles the sleeve axis.

9. The transport tray according to claim 1, wherein the top opening of each sleeve is larger than the bottom opening, such that the sleeve wall forms an angle greater than 0° relative to the sleeve axis.

10. The transport tray according to claim 1, further comprising a connecting portion that connects the sleeve walls of at least two adjacent sleeves to the plate portion.

11. The transport tray according to claim 1, wherein the perimeter of plate portion comprises the raised bumpers and an edge portion having the same thickness as the plate portion arranged between each pair of adjacent raised bumpers.

12. The transport tray according to claim 2, wherein each sleeve wall comprises a closed cylinder that encircles the sleeve axis.

13. The transport tray according to claim 2, wherein the top opening of each sleeve is larger than the bottom opening, such that the sleeve wall forms an angle greater than 0° relative to the sleeve axis.

14. The transport tray according to claim 2, further comprising a connecting portion that connects the sleeve walls of at least two adjacent sleeves to the plate portion.

15. The transport tray according to claim 1, wherein a projection height of the first projection and the second projection of each raised bumper is greater than the thickness of the plate portion.

16. The transport tray according to claim 15, wherein the projection height is the same as the height of the raised bumper.

17. The transport tray according to claim 1, wherein each raised bumper abuts an edge of the plate portion.

18. A transport tray, comprising:
a plurality of sleeves, wherein each sleeve is configured to receive a substantially cylindrical container having a cylindrical container wall and a container bottom surface arranged orthogonally to the container wall;
wherein each sleeve comprises:
a top opening,
a bottom opening,
a sleeve wall that extends along a sleeve axis between the top opening and the bottom opening and is configured to abut at least a portion of the container wall of a respective container, and one or more support feet that are adjacent to the bottom opening and extend from the sleeve wall towards the sleeve axis, wherein each support foot comprises a bottom surface and a top surface configured to abut the container bottom surface of a respective container, such that a gap is formed between the support foot bottom surface and the container bottom surface along the sleeve axis, and wherein the one or more support feet comprise a thermally conductive polymer;

a plate portion connected to the top opening of each sleeve and comprising a plurality of corner regions; and raised bumper that extends along an entirety of a perimeter of the plate portion, wherein the raised bumper has a height that is greater than a thickness of the plate portion;

wherein the raised bumper comprises a first projection and a second projection at each respective corner region of the plurality of corner regions of the plate portion, where the first projection is positioned on a first side of the respective corner region, the second projection is positioned on a second side of the respective corner region, and the second projection spaced apart from the first projection, wherein each first projection and second projection extend from the perimeter of the plate portion in an outward direction that is in-plane with a top surface of the plate portion.

\*　　\*　　\*　　\*　　\*